United States Patent [19]
Herget et al.

[11] Patent Number: 6,081,256
[45] Date of Patent: Jun. 27, 2000

[54] METHOD FOR READING IN A DATA VALUE INTO A COMPUTER

[75] Inventors: Martin Herget, Erlangen; Diana Martin, Laaber, both of Germany

[73] Assignee: Siemens Aktiengesellschaft, Munich, Germany

[21] Appl. No.: 09/164,884

[22] Filed: Oct. 1, 1998

[30] Foreign Application Priority Data

Oct. 1, 1997 [DE] Germany .................. 197 43 551

[51] Int. Cl.$^7$ .................................................. G09G 5/08
[52] U.S. Cl. .................................. 345/159; 345/124
[58] Field of Search ........................... 345/161, 160, 345/123, 124, 125, 157, 358, 145, 146, 355, 159; 347/145, 146

[56] References Cited

U.S. PATENT DOCUMENTS

| | | | |
|---|---|---|---|
| 4,931,783 | 6/1990 | Atkinson | 345/163 |
| 5,059,965 | 10/1991 | Geiser | 340/995 |
| 5,128,887 | 7/1992 | Smith et al. | 708/551 |
| 5,270,689 | 12/1993 | Hermann | 345/145 |
| 5,289,205 | 2/1994 | Torres | 345/124 |
| 5,485,175 | 1/1996 | Suzuki | 395/156 |
| 5,742,276 | 4/1998 | Taraki | 345/134 |
| 5,796,399 | 8/1998 | Alderson | 345/339 |
| 5,859,638 | 1/1999 | Coleman et al. | 345/341 |

FOREIGN PATENT DOCUMENTS

WO 95/04340  2/1995  WIPO .

OTHER PUBLICATIONS

IBM® Technical Disclosure Bulletin, vol. 38, No. 02, Feb. 1995, "Three–Dimensional Selection Widget," p. 423.

*Primary Examiner*—Steven J. Saras
*Assistant Examiner*—Alecia D. Nelson
*Attorney, Agent, or Firm*—Hill & Simpson

[57] ABSTRACT

In a method for reading in a data value that is entered with a pointer actuator a data value as well as a place value (i.e., $10^x$ where x is arbitrary) is prescribed, a control motion is read in, at least a first motion value or a second motion value dependent on the control motion is determined, and the place value is modified if necessary dependent on the first motion value and the data value is modified if necessary dependent on the second motion value and the current place value. With such a method, data values can be entered fast and comfortably with a pointer in a large value range and with high precision.

14 Claims, 2 Drawing Sheets

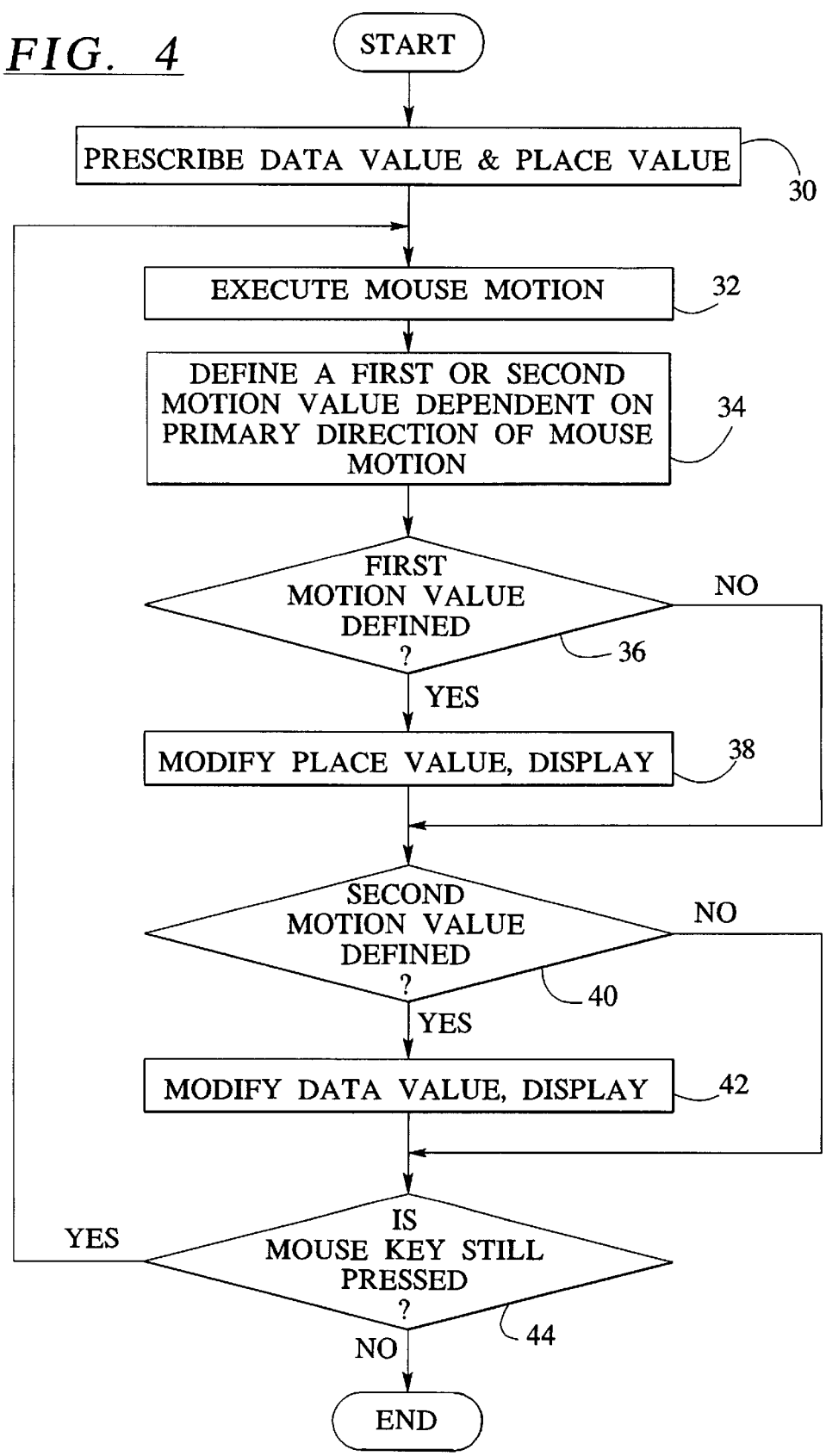

METHOD FOR READING IN A DATA VALUE INTO A COMPUTER

BACKGROUND OF THE INVENTION

1. Field of the Invention

The present invention is directed to a method for reading in a data value, whereby the data value is entered by a user with a pointer actuator. The invention can be utilized in all devices and applications wherein a data input is required. For example, the invention can be employed in computers, terminals, automats (for example, ATMS), telecommunication devices and operating devices for the control of technical equipment. In particular, the inventive method is provided for utilization in nuclear magnetic resonance tomography systems that can be operated proceeding from the patient compartment (referred to as "in room" operation).

2. Description of the Prior Art

A keyboard is often provided for the entry of data into a technical device. This, however, is not always optimum in view of the user-friendliness, particularly given graphical user interfaces. Dependent on the field of application, it can also be less desirable to employ a keyboard for other reasons. For example, keyboards given publicly accessible devices must be designed in complicated, mechanically protected embodiment in order to prevent intentional or unintentional damage. Given the aforementioned applied example of "in room" operation of a nuclear magnetic resonance tomograph, a specific console that has no keyboard is utilized in order to avoid magnetic disturbances.

It is known in graphical user interfaces to enter numerical data with a pointer, for example a mouse, by graphically portrayed shift controllers or by up/down counting knobs ("spin buttons").

Given a shift controller, the numerical data value can be set between two extreme values by displacing a control button displayed on a picture screen, however, the space requirement on the picture screen is extremely high. Shift controllers are therefore often employed in two-stage input methods wherein a dialog window is initially opened with a first action and the value is then entered with a second action. Such two-stage methods are usually considered cumbersome by the user. An exact setting of the data value given shift controllers is also difficult or impossible when the value range is large, since even the smallest modifications in the position of the control button already cause relatively large skips of the input data value. The limits of the value range are permanently prescribed and cannot be modified with the shift controller.

Spin buttons are active picture screen areas that are typically combined with a display field for the current data value. The numerical data value is incremented by a predetermined step width given every mouse click on the up button and the data value is correspondingly diminished with every mouse click on the down button. Spin buttons, however, are not particularly practical when a data value is to be exactly set within a large value range. Dependent on the predetermined step width, namely, the data value can either be only roughly set (given a large step width) or it takes a long time (given a small step width) until the value range of the shift controller has been run through up to the desired data value.

PCT Application WO 95/04340 discloses a method and an apparatus for selecting a travel destination in a vehicle navigation system. The apparatus has a switch rocker with four contacts that are actuated by a user pressing on the upper, lower, right or left edge of the rocker. In a mode for entering a house number, a cursor is moved toward the right or left by actuating the right or left contact, and the numeral of the house number marked by the cursor can be incremented or reduced by actuating the upper or lower contact.

The article "Three-Dimensional Selection Widget" in IBM Technical Disclosure Bulletin, Vol. 38, No. 2, February 1995, page 423, discloses an operating element for graphical user interfaces. The operating element is reminiscent of a rotatable cylinder on whose surface different selection possibilities are indicated. The cylinder can be turned either by implementing a mouse motion transversely relative to the cylinder, or by a mouse click onto the upper or lower part of the cylinder.

SUMMARY OF THE INVENTION

An object of the present invention is to avoid the aforementioned problems in a method with which data values can be quickly and comfortably entered with a pointer actuator in a large value range and with high precision.

The above object is achieved in accordance with the principles of the present invention in a method wherein a data value and a mathematical place value for the data value are prescribed in a computer, a control motion is executed with a pointer actuator and this control motion is read into the computer, a determination is made within the computer as to whether the control motion contains one or both of a first motion value and a second motion value, if the control motion produced a first motion value, the mathematical place value is modified by an amount which is exclusively dependent on the first motion value, and if the second motion value was produced by the control motion, the data value is then modified exclusively dependent on the second motion value and on a current value of the mathematical place value. The current value of the mathematical place value is either the initially prescribed value, if no modification thereof took place due to the absence of a first motion value, or is the initial mathematical place value modified dependent on the first motion value, if the first motion value is present in the control motion.

The above-stated sequence of the enumeration of the method steps is not intended to represent a limitation of the invention. The steps can also be inventively implemented in some other sequence or parallel or nested in one another or meshed (quasi-parallel).

The invention is based on the basic idea of determining at least a first motion value or a second motion value based on a control motion of a user, setting or modifying a place value dependent on the first motion value, and setting or modifying the data value dependent on the place value as well as on the second motion value.

Because the place value is inventively variable, numerical data values, in particular, can be entered fast and simply in a large value range. For example, the user can select a place value that corresponds to a more significant place of the data value and can then designationally modify this place. Such a designational modification of individual positions is also possible given non-numerical or composite data values.

Additionally, the invention enables the entry of, in particular, numerical data values in very small steps, by selecting the place value to be corresponding small.

The inventive method does not require that the value range for the data value be fixed in advance. On the contrary, the data input can ensue in a practically unlimited value range. When, on the other hand, a value range is predetermined, the invention offers the possibility of rapidly setting the allowable maximum or minimum values.

Inventively, at least a first or a second motion value is determined dependent on the control motion. The inventive method provides both for the determination of the first motion value as well as for the determination of the second motion value so as to at least have them available, even when both motion values need not be defined in every method execution. This includes embodiments wherein both motion values are determined from an input control motion either always or on a case-by-case basis. Preferably, the user has the possibility of specifying—by the control motion or in some other way—whether the first or the second motion value is to be determined. Each motion value corresponds to the extent of an actual motion of the pointer.

The inventively pointer actuator can be fashioned as a mouse or a track ball or a joystick or a touch-sensitive surface or in some other way.

Suitable information is required in order to be able to determine the first and/or the second motion value from the control motion. This information is preferably based on the motion direction or a change in direction or on an intermediate stop of the motion. For example, the first motion value can be derived from an essentially horizontally proceeding control motion or from an essentially horizontal first segment of the control motion. Analogously, the second motion value can be derived from an essentially vertically proceeding control motion or from an essentially vertical, second segment of the control motion. The terms "horizontal" and "vertical" refer to the direction of a visualization of the motion of the pointer presented on a display device relative to the presentation of text or data values on the display device. In other embodiments, the allocation of a control motion to the first and/or to the second motion value ensues in another way, for example by actuating or releasing a key arranged at the pointer actuator.

In preferred embodiments, the method execution is directly and constantly answered back to the user. Preferably, all motions of the pointer actuator are displayed on the display device. Further, the current data value can be continuously displayed for the user in a predetermined display field of the display device. The first motion value can thereby also be visualized, for example by emphasizing a position on the screen of the data value corresponding to the place value.

In order to distinguish control motions for entering the data value from other motions of the pointer actuator, a predetermined, active region on the display device is preferably provided from which every visualized control motion proceeds. The method is preferably begun by a first event triggered by the user. This event can be the actuation of a key of the pointer device (for example, a mouse click). The active region can, for example, be fashioned like a knurled wheel of a clock, and the second motion value can be visualized as a simulated rotation of this knurled wheel. The control motion is preferably determined as long as the user keeps pressing the key of the pointer actuator.

Even when an optical visualization is provided, the inventive method requires only extremely little space on the display screen because no large-area user fields must be presented. The active region as well as the display field for the current data value are preferably constantly displayed on the display screen. A fast access to the operating elements is thus possible. In particular, a two-stage input method need not be implemented, as is often required given operation elements that require a large amount of picture screen space.

The method is especially well-suited for the input of a numerical data value. The data value, however, can also be text components and/or components that represent a selection from several possibilities (for example, physical units). In the case of numerical data values, the place value preferably defines a step width with which the data value is incremented or decremented. This step width preferably coincides with the significance of a numerical place in the data value referenced by the place value. Given decimal numbers, the step width therefore amounts to $10^x$ for a whole value X defined by the place value. In other embodiments, other step widths can be selected that correspond to a non-whole value X in the formula $10^x$.

Preferably, the data value is rounded to a multiple of the step width in every modification. A constant rounding up or rounding down, a rounding to the closest multiple of the step width or some other rounding method are thereby possible.

In preferred embodiments, the modification of the place value and/or of the data value is determined dependent on a motion path and a motion rate of the pointer actuator. For example, a fast motion by a certain distance can effect a greater modification than a slow motion by the same distance.

DESCRIPTION OF THE DRAWINGS

FIG. 4 is a flowchart of an exemplary embodiment of the inventive method.

DESCRIPTION OF THE PREFERRED EMBODIMENTS

Figure 1:
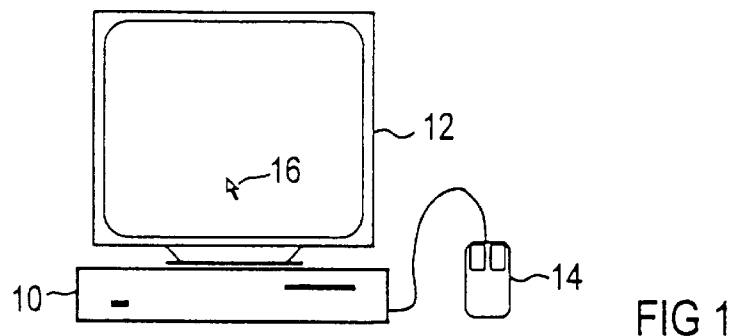
FIG. 1 shows the basic components of an input console for implement the inventive method.

The input console shown in FIG. 1 is provided for "in room" operation of a nuclear magnetic resonance tomography apparatus, and has a control unit 10 that is fashioned as a PC-compatible computer. The control unit 10 is connected to a display 12 fashioned as picture screen as well as to a pointer actuator 14. The pointer actuator 14 is fashioned as a mouse with two mouse keys in this exemplary embodiment. By means of an operating system with a graphical user interface implemented by the control unit 10, an arrow-like mark 16 ("mouse pointer") is constantly displayed on the picture screen and follows the mouse movements of the user.

Figure 2A:
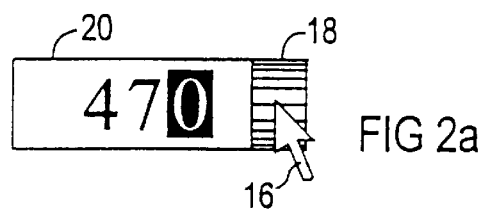
FIGS. 2a and 2b illustrate a display image excerpt during a first input event in accordance with the inventive method.

Given the image excerpt of the display 12 shown in FIG. 2a, the marking 16 is located in an active region 18 that is graphically fashioned as knurled wheel (similar to the adjustment wheel of a wristwatch). A display field 20 for displaying the current data value in textural form (text field) is connected to the active region 18.

For modifying the value in the display field 20 with a step width that is determined by a place value predetermined by the user, the user moves the marking 16 with the pointer actuator 14 into the active region 18 and then presses the mouse key. Subsequently, as shown in FIG. 2a, a place of the data value corresponding to the predetermined place value is emphasized (inverted) in the display field 20.

When the user, continuing to press the mouse key, then displaces the marking 16 toward the top or, respectively, toward the bottom with the pointer actuator 14, then the data value in the display field 20 increases or decreases dependent on the distance and the speed of the motion and on the step width defined by the place value. This motion of the marking 16 in the direction of a vertical axis is visualized in the active region 18 by a perceptible displacement of the lines representing the knurled wheel. The user is thus provided with the impression of turning the knurled wheel with the pointer actuator 14 and modifying the data value like setting a clock.

Figure 2B:
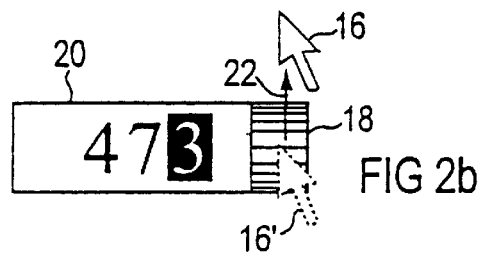

As an example, FIG. 2b shows the result of a motion of the marking 16 from its original position 16' upwardly in the direction of the arrow 22. Here, the data value has been incremented by three units. The arrow 22 shown in FIG. 2b and the broken-line marking arrow at the position 16' merely illustrate the movement and are not visible on the display 12.

Given the input event of FIG. 2a and FIG. 2b, the predetermined place value referenced the one's place. Accordingly, the data value was modified by one's steps in the vertical motion of the pointer actuator 14. The user, however, can enlarge or diminish the predetermined place value by a horizontal movement of the pointer actuator 14 (for example, to post-decimal point places). This is illustrated in FIGS. 3a through 3c.

Figure 3A:
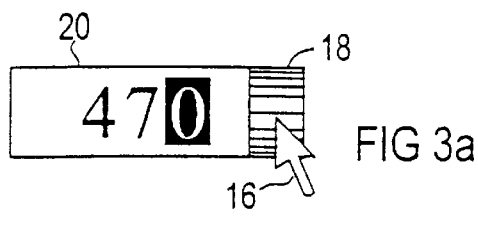
FIGS. 3a through 3c illustrate a display image excerpt during a second input event in accordance with the inventive method.
Figure 3B:
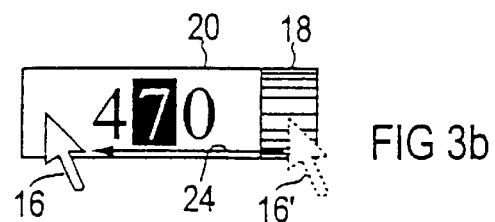
Figure 3C:
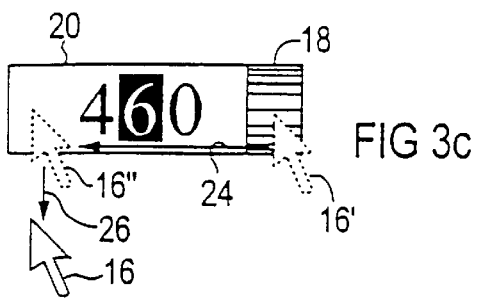

The initial situation illustrated in FIG. 3a corresponds to that of FIG. 2a. When the user, as shown in FIG. 3b, then displaces the marking 16 with the pointer actuator 14 in the direction of the arrow 24 toward the left while continuing to press the mouse key, then the predetermined place value is incremented from the one's place to the ten's place and the ten's place of the indicated data value is emphasized in order to inform the user of this modification. The user can now modify the data value by vertical motion of the pointer actuator 14 in the way already described, with the step width of the modification is now being determined by the modified place value. In FIG. 3c, for example, the user moves the marking 16 from the intermediate position 16" in the direction of the arrow 26 downward. This motion corresponds to a modification step, so that the ten's place is reduced by one unit given the step width predetermined by the place value.

Given the method illustrated here, the user can thus modify the decimal location at which a following up/down motion is to take effect by a left/right motion of the pointer actuator 14. This change between the modification of the place value on the basis of a first motion type and the modification of the actual data value on the basis of a second motion type is continued as long as the user continues to press the mouse key.

The method steps implemented upon read-in of a data value are shown again in greater detail in FIG. 4. The operating system of the control unit 10 starts the illustrated execution as soon as the user moves the marking 16 into the active region 18 with the mouse key being actuated.

In step 30, a data value and a place value are first prescribed. The prescribed data value usually corresponds to that data value that is being momentarily displayed in the display field 20. Optimally, a pre-set default value can be employed. The predetermined place value is set to a suitable, pre-set value dependent on the order to magnitude of the anticipated data value. This value often references the one's place.

In step 32, a mouse motion (motion of the pointer actuator 14) executed by the user is then identified. The motion in step 34 is initially classified according to whether it proceeds primarily vertically or primarily horizontally.

Given a mainly horizontal motion, a first motion value is then determined from the identified mouse motion. To that end, the horizontal motion component of the mouse motion is first calculated, i.e. the pixel columns that were crossed by the marking 16 during the motion. Any remainders that arose given immediately preceding horizontal motions and were not converted into a corresponding modification of the place value are counted to this motion component.

After a first motion value has been defined in this way (interrogation 36), the place value is correspondingly modified in step 38. In the exemplary embodiment described here, each two traversed pixel columns effect a modification of the place value by one decimal place in the direction indicated by the mouse motion. Any remainder of the first motion value is stored for future loop passes of the input procedure so that no irregularities in the forwarding of the place value occur given a continued horizontal motion.

Likewise in step 38, the modified place value is now visualized by emphasizing the active decimal location of the data value according to the current place value in the display field 20 by inversion. It may be necessary to precede the data value with leading zeroes or to attach one or more post-decimal point places. Given extremely large or extremely small values, it can be provided in alternative embodiments to switch to an exponential presentation.

Since a mouse motion given the exemplary embodiment described here is classified as primarily horizontal or as primarily vertical, no second motion value has been defined in this loop pass in step 34. The step 42 is thus skipped by the interrogation 40. A determination is now made in the interrogation 44 as to whether the user continues to press the mouse key. When this is the case, then the read-in procedure is continued; otherwise, the execution ends.

When, given a loop pass, the mouse motion identified in step 32 has been classified as primarily vertical in step 34, then a second motion value is determined therefrom. Analogous to the determination of the first motion value, only the vertical motion component of the mouse motion is utilized, i.e. the number of traversed pixel rows. The number determined in this way, however, is still scaled with the motion speed. The effect of the motion is thus intensified by a fast vertical mouse motion. The dependency of the scaling factor on the motion speed is linear in the present exemplary embodiment and is stepped or non-linear in some other way in alternative embodiments. Potential remainders from immediately preceding, primarily vertical motions are also added to the result of the scaling in order to obtain the second motion value.

Since a second motion value but not first motion value has been determined in this loop pass, the step 38 is skipped by the interrogation 36. Step 42 is reached via the interrogation 40. In this step, a number of modification steps is first determined from the second motion value. In the exemplary embodiment illustrated here, a modification step ensues for three vertically traversed pixel rows. Any remainder is stored for later loop passes. The modification steps are now implemented with the step width defined by the place value, but the value obtained in the first modification step is rounded to the closest multiple of the step width. For example, the step width amounts to 100 when the place value references the hundred's place, and the data value changes from, for example, 2835 to 2900, then to 3000, then to 3100, etc.

The data value modified in this way is visualized, likewise in step 42, by being displayed in the display field 20. Again, a switch into an exponential presentation can ensue. Dependent on the status of the mouse key, the method is either continued or ended following step 42 (interrogation 44).

Given the exemplary embodiment described herein, only the first motion value or only the second motion value was defined in step 34. In alternative embodiments wherein more complex mouse motions can be identified in step 32, both motion values can be calculated from one mouse motion (for example, a hook-shaped mouse motion). In this case, the steps 38 and 42 are implemented in a single loop pass. In general, however, it must be taken into consideration in the interpretation of the mouse motions that these typically deviate more and more from the horizontal and vertical directions the farther they move away from the active region 18.

In further alternative embodiments that provide an exponential presentation, the exponent can be treated as part of the numerical data value. Places of the exponent, just like places of the mantissa, can then be selected by a horizontal mouse motion and be modified by a vertical mouse motion.

In further alternative embodiments, a pop-up menu via which properties of these control elements can be set is allocated to the active region 18 and/or to the display field 20. In particular, maximum and minimum values can be entered in this way. In these and other alternative embodiments that provide limited value ranges, a "striking" of the data value at a limit can be indicated to the user by causing the knurled edge presentation in the active region 18 to no longer move.

The inventive method was very positively evaluated in usability tests. Many users set values with the method disclosed here in test scenarios even though they indicated that they normally preferred to work with a keyboard.

Although modifications and changes may be suggested by those skilled in the art, it is the intention of the inventor to embody within the patent warranted hereon all changes and modifications as reasonably and properly come within the scope of his contribution to the art.

We claim as our invention:

1. A method for reading a data value into a computer having a display screen with a movable pointer moved by a pointer actuator having a depressable key, comprising the steps of:

(a) prescribing a data value and a mathematical place value for said data value in said computer, said mathematical place value defining a variable position within said data value;

(b) depressing said key of said pointer actuator to signal a beginning of a control motion and executing said control motion with a motion speed and with said pointer actuator in communication with said computer and reading said control motion into said computer, said control motion producing at least one of a first motion value and a second motion value;

(c) determining in said computer whether one or both of said first motion value and said second motion value was produced by said control motion;

(d) if said first motion value was produced by said control motion, modifying said mathematical place value by an amount exclusively dependent on said first motion value to set said variable position;

(e) if said second motion value was produced by said control motion, modifying said data value by an amount exclusively dependent on said second motion value, scaled dependent on said motion speed, and a current value of said mathematical place value; and (f) repeating steps (b) through (e) to continue said control motion as long as said key remains depressed.

2. A method as claimed in claim 1 comprising the step of selecting said pointer actuator from the group consisting of a mouse, a track ball, a joystick and a touch-sensitive surface.

3. A method as claimed in claim 1 wherein step (b) comprises executing said control motion relative to a first axis and a second axis, and wherein said first motion value comprises at least a segment of said control motion proceeding primarily along said first axis, and wherein said second motion value comprises at least a segment of said control motion proceeding primarily along said second axis.

4. A method as claimed in claim 3 wherein said first axis comprises a horizontal axis and wherein said second axis comprises a vertical axis.

5. A method as claimed in claim 1 wherein step (b) comprises executing a control motion relative to a first axis and a second axis, said control motion containing a first component associated with motion relative to said first axis and a second component associated with motion relative to said second axis, and wherein said first motion value comprises at least a portion of said first component and wherein said second motion value comprises at least a portion of said second component.

6. A method as claimed in claim 5 wherein said first axis comprises a horizontal axis and wherein said second axis comprises a vertical axis.

7. A method as claimed in claim 1 comprising the additional step of displaying said control motion on said display screen with a control motion marking in an active region on said display screen.

8. A method as claimed in claim 7 comprising the step of separately displaying said second motion value in said active region on said display screen.

9. A method as claimed in claim 7 comprising the step of continuously displaying said current data value in a display field on said display screen.

10. A method as claimed in claim 9 comprising the step of displaying said first motion value separately in said display field.

11. A method as claimed in claim 1 wherein step (a) comprises prescribing a numerical value as said data value.

12. A method as claimed in claim 11 wherein step (e) comprises modifying said data value with a modification step width dependent on said current place value.

13. A method as claimed in claim 12 comprising the step of making said modification with exponentially dependent on said current place value.

14. A method as claimed in claim 12 wherein step (e) comprises rounding said data value dependent on said current place value.

* * * * *